United States Patent
Favresse et al.

(10) Patent No.: US 10,399,051 B2
(45) Date of Patent: Sep. 3, 2019

(54) DISPERSANTS

(71) Applicant: Evonik Degussa GmbH, Essen (DE)

(72) Inventors: Philippe Favresse, Ratingen (DE); Sandra Rödiger, Bochum (DE); Kim Judith Kreft, Essen (DE); Julia Schmidt, Essen (DE)

(73) Assignee: Evonik Degussa GmbH, Essen (DE)

( * ) Notice: Subject to any disclaimer, the term of this patent is extended or adjusted under 35 U.S.C. 154(b) by 21 days.

(21) Appl. No.: 15/447,424

(22) Filed: Mar. 2, 2017

(65) Prior Publication Data

US 2017/0274335 A1    Sep. 28, 2017

(30) Foreign Application Priority Data

Mar. 24, 2016 (EP) .................................... 16162122

(51) Int. Cl.
| | | |
|---|---|---|
| *C08G 73/02* | (2006.01) | |
| *B01F 17/00* | (2006.01) | |
| *C08G 63/06* | (2006.01) | |
| *C08G 63/08* | (2006.01) | |
| *C09D 11/03* | (2014.01) | |

(52) U.S. Cl.
CPC ............ *B01F 17/005* (2013.01); *C08G 63/06* (2013.01); *C08G 63/08* (2013.01); *C08G 73/0206* (2013.01); *C09D 11/03* (2013.01)

(58) Field of Classification Search
CPC .... C08G 63/06; C08G 63/08; C08G 73/0206; C08G 73/02; B01F 17/005
See application file for complete search history.

(56) References Cited

U.S. PATENT DOCUMENTS

| | | | |
|---|---|---|---|
| 6,197,877 B1* | 3/2001 | Thetford ............ | B01F 17/0028 524/539 |
| 6,878,799 B2* | 4/2005 | He ..................... | C08F 8/00 528/332 |
| 7,442,724 B2 | 10/2008 | Esselborn et al. | |
| 7,838,603 B2 | 11/2010 | Schwab et al. | |
| 9,115,335 B2 | 8/2015 | Trosin et al. | |
| 10,190,006 B2* | 1/2019 | Fomara .............. | B41J 2/01 |
| 2010/0174046 A1* | 7/2010 | Liu .................... | B01F 17/005 528/332 |
| 2011/0144269 A1 | 6/2011 | Kuppert et al. | |
| 2012/0037036 A1 | 2/2012 | Veit et al. | |
| 2013/0281552 A1 | 10/2013 | Nilewski et al. | |
| 2015/0240020 A1 | 8/2015 | Veit et al. | |

FOREIGN PATENT DOCUMENTS

| | | |
|---|---|---|
| GB | 1508576 A | 4/1978 |
| GB | 2108143 A | 5/1983 |
| KR | 100712019 B1 | 4/2007 |
| WO | 9421368 A1 | 9/1994 |
| WO | 9955763 A1 | 11/1999 |
| WO | 0121298 A1 | 3/2001 |
| WO | 2007110333 A1 | 10/2007 |

OTHER PUBLICATIONS

European Search Report dated Sep. 6, 2016 in EP 16162122.2 (7 pages).

* cited by examiner

*Primary Examiner* — Robert C Boyle
(74) *Attorney, Agent, or Firm* — Philip P. McCann; Nexsen Pruet PLLC

(57) ABSTRACT

The present invention relates to dispersants based on polyamines or polyimines containing side chains based on two or more poly(oxy-$C_{1-6}$-alkylenecarbonyl) compounds (A) and side chains based on alkyl acid (B).

16 Claims, No Drawings

DISPERSANTS

This application claims the benefit of European Application No. 16162122.2 filed on Mar. 24, 2016, the disclosure of which is expressly incorporated herein by reference.

BACKGROUND

The present invention relates to dispersants based on polyamines or polyimines containing side chains based on two or more poly(oxy-$C_{1-6}$-alkylenecarbonyl) compounds and methods for their preparation and their use.

Dispersants containing one or more poly(oxy-$C_{1-6}$-alkylenecarbonyl) chains are known and are usually prepared by copolymerization with ε-caprolactone. They are generally used for dispersing of particulate solid particles in an organic solvent and contain either acidic and/or basic end groups.

Dispersants containing terminal-based groups are described in application WO 94/21368 and include reaction products of polyethyleneimine with ε-caprolactone in the presence of aliphatic and hydroxyaliphatic carboxylic acids which act as chain terminators during the polymerization of the ε-caprolactone. A disadvantage of the dispersants mentioned is their high tendency to crystallize, whether in the presence or absence of solvents, which makes practical use of such dispersants difficult. The crystallized dispersants have to be correspondingly heated and then homogenized prior to the use thereof.

WO 99/55763 and WO 01/21298 describe the production of dispersants based on the use of at least two lactones. The production of such dispersants enables the suppression of the crystallization. However, the lactones used therein are costly and not always freely available on the market.

The problem addressed by the present invention is therefore that of providing dispersants that are easy and inexpensive to prepare and have only a low tendency to crystallization, and at the same time do not have any detriments in the technical application tests, for instance the rub-out test, the color test or the viscosity test.

SUMMARY

To solve the problem, a dispersant of the type specified at the outset is proposed, wherein the dispersant has side chains based on two or more poly(oxy-$C_{1-6}$-alkylenecarbonyl) compounds (A) and side chains based on alkyl acids (B).

It has been found that amidation of the polyamine or polyimine with alkyl acids (B) can reduce or suppress the crystallization of the dispersant of the invention.

The dispersants of the invention are neither crystalline nor solid at temperatures below 25° C., nor do they crystallize out in solid form in organic solvents.

Preferably, the dispersants of the invention are free-flowing at room temperature.

DETAILED DESCRIPTION

The dispersants of the invention are based on polyamines or polyimines having primary amino groups. Side chains based on two or more poly(oxy-$C_{1-6}$-alkylenecarbonyl) compounds (A) and side chains based on alkyl acids (B) are chemically bonded to the polyamines or polyimines. The bond may be an amide bonds or may be salt-type bonds between the primary amino groups of the polyamines or polyimines and the side chains based on two or more poly(oxy-$C_{1-6}$-alkylenecarbonyl) compounds (A) and alkyl acids (B), preference being given to linkages via amide bonds.

Examples of suitable polyamines are polyallylamine and polyvinylamine. Examples of suitable polyimines are poly-($C_{2-4}$)-alkyleneimine (PAI hereinafter) and especially polyethyleneimine (PEI hereinafter).

Accordingly, the poly-($C_{2-4}$)-alkyleneimine used in accordance with the invention is preferably a polyethyleneimine (PEI), which may be linear or branched. The polyethyleneimines are preferably multifunctional, cationic polyethyleneimines with a branched polymer structure. The constitution thereof is represented by the empirical formula —$(CH_2$—$CH_2$—$NH)_n$— with $4<n<14000$. The polyethyleneimines are generally clear to slightly cloudy, colorless to yellowish liquids. The viscosity thereof depends on the molecular weight, concentration and degree of branching.

Polyethyleneimines are amino functional polymers having a hyperbranched polymer structure. The distribution of primary, secondary and tertiary amines in these hyperbranched polymer structures has an average of about 38% primary amines, 36% secondary amines and 26% tertiary amines. This is typically determined by means of NMR spectroscopy (13C). A method which is described in the Journal of Macromolecular Science 'Carbon-13 NMR analysis of branched polyethyleneimine (1985, A22 (5-7), 877). Alternatively, the amine distribution of these polymers can be taken from the technical information materials from the raw material suppliers.

The polyamine or polyimine used in accordance with the invention, especially the preferred poly-($C_{2-4}$)-alkyleneimine, preferably the polyethyleneimine used, especially has a mean molecular weight Mw between 200 and 600000 g/mol, more preferably between 400 and 100000 g/mol, most preferably between 600 and 30000 g/mol. The number-average molar mass of the polyamine or polyimine is preferably 200 to 25000 g/mol, more preferably 500 to 10000 g/mol.

Preferred polyethyleneimines are commercially available, for example, under the Lupasol® name from the BASF SE Company or the EPOMIN™ name from the Nippon Shokubai Company.

According to the invention, the dispersant of the invention has side chains based on two or more poly(oxy-$C_{1-6}$-alkylenecarbonyl) compounds (A). These side chains are also called POAC side chains hereinafter.

Preferably, the poly(oxy-$C_{1-6}$-alkylenecarbonyl) compounds (A) are selected from the group of linear hydroxy-$C_{1-6}$-alkylenecarboxylic acids and lactones.

Examples of suitable hydroxy-$C_{1-6}$-alkylenecarboxylic acids are glycolic, lactic, hydroxyvaleric and hydroxycaproic acids.

More preferably, the poly(oxy-$C_{1-6}$-alkylenecarbonyl) compounds (A) are selected from the group of lactones, for example β-propiolactone, γ-butyrolactone, δ-valerolactone and ε-caprolactone.

The poly(oxy-$C_{1-6}$-alkylenecarbonyl) compounds (A) in the context of the present invention are preferably homopolymers having different chain lengths.

In addition, the dispersant of the invention has side chains based on alkyl acids (B), likewise bonded to the polyamines or polyimines. In principle, there are no restrictions with regard to the structure of the alkyl acids (B) to be used.

More particularly, the alkyl acids (B) may be aromatic, alicyclic, heterocyclic or aliphatic carboxylic acids which are linear or branched, and saturated or unsaturated. Preferably, the alkyl acids (B) have 1 to 35 carbon atoms, preferably not more than 20 carbon atoms and more preferably not more than 12 carbon atoms.

Preferably, the alkyl acids (B) are selected from the group of acetic, methoxyacetic, propionic, pentanoic, hexanoic, caprylic, capric, lauric, ricinoleic, stearic acid and hydroxystearic acid.

The dispersant of the invention preferably has an acid number (AcN) of <10 mg KOH/g, preferably <5 mg KOH/g.

The dispersant of the invention preferably has an amine number (AmN) of >100 mg KOH/g, preferably >120 mg KOH/g.

Preferably, the dispersant has a ratio of amine number to acid number of >10, preferably >20.

Preferably, the molar ratio of the sum total of side chains based on two or more poly(oxy-$C_{1-6}$-alkylenecarbonyl) compounds (A) and side chains based on alkyl acid (B) to primary amino groups of the polyamines or polyimines used is less than 1. This means that the molar proportion of the sum total of side chains based on two or more poly(oxy-$C_{1-6}$-alkylenecarbonyl) compounds (A) and side chains based on alkyl acid (B) is less than the molar proportion of the primary amino groups of the polyamine or polyimine used.

The proportion of the primary amino groups in the polyamines or polyimines used can be determined by means of NMR spectroscopy (13C). A method which is described in the Journal of Macromolecular Science 'Carbon-13 NMR analysis of branched polyethylenimine (1985, A22 (5-7), 877).

Typically, the proportion of the primary amino groups is listed in the technical information materials from the raw material suppliers.

The molar proportion between the two or more different poly(oxy-$C_{1-6}$-alkylenecarbonyl) chains (A) and the alkyl acids (B) should be between 90/10 and 10/90. Preferably, the ratio between (A) and (B) should be between 80/20 and 20/80 and more preferably between 70/30 and 30/70.

In a preferred embodiment, the dispersion of the invention can be represented schematically by means of the following formula (I):

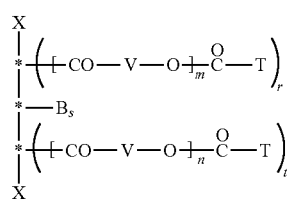

Formula (I)

in which
X-*-*-*-X is a polyamine or polyimine,

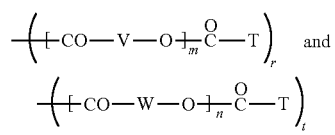

are POAC chains,
with T=a saturated or unsaturated alkyl group,
V=an alkylene or alkenylene group of the particular hydroxy-$C_{1-6}$-alkylenecarboxylic acids or of the lactone, m and n=each 3 to 40, where m and n are different from one another,
r and t=each 1 to 100, and
B=alkyl acids with s=1 to 100.

It is also preferable that m and n is not less than 3 and more preferably not less than 5. Preferably, n is not greater than 40, preferably not greater than 30 and more preferably not greater than 15.

The chain length of the poly(oxy-$C_{1-6}$-alkylenecarbonyl) compounds (A) for formation of the POAC side chains on the polyamine or polyimine is represented by the number of repeat units of the [—O—V—CO—] unit.

The dispersant may preferably have 3 to 40 repeat units in this unit. Preferably, the chain length of the poly(oxy-$C_{1-6}$-alkylenecarbonyl) compounds (A) is not more than 30 and more preferably not more than 15 repeat units.

Preferably, r, s and t are not less than 1 and more preferably not less than 3.

It is also preferable that r, s and t are not greater than 100 and more preferably not greater than 60.

The dispersants of the invention may take the form of their salts with either an inorganic acid or an organic acid. Examples of such acids are hydrogen halides such as hydrochloric acid and acetic acid. The dispersant of the invention may also take the form of a quaternary ammonium salt. Such quaternary ammonium salts can be obtained by reacting at least one of the free amino or imino groups of the dispersants with alkylating agents such as alkyl halides, for example methyl chloride, or with alkyl sulphates such as dimethyl sulphate.

The dispersant of the invention may also take the form of a salt with a "colored acid". The term "colored acid" means an organic pigment or an organic dye containing at least one acid group, preferably 1 to 6 acid groups, more preferably sulphonic, phosphonic or carboxylic acid groups. A preferred colored acid is copper phthalocyanine or another intensely colored pigment and more preferably sulphonated containing an average of 0.5 to 3 sulpho groups per molecule.

The present invention likewise provides a method for preparing the dispersants of the invention, comprising the reaction of polyamines or polyimines with at least two or more polymers based on poly(oxy-$C_{1-6}$-alkylenecarbonyl) compounds (A) and alkyl acids (B), wherein an amidation of alkyl acids (B) with the polyamines or polyimines takes place.

Preferably, the molar ratio of the sum total of the polymers based on poly(oxy-$C_{1-6}$-alkylenecarbonyl) compounds (A) and alkyl acids (B) to primary amino groups of the polyamines or polyimines used is less than 1, preferably less than 0.9.

This means that the molar proportion of the polymers (A) and the alkyl acids (B) is less than the molar proportion of the primary amino groups of the polyamine or polyimine.

The molar ratio between the polymers (A) and the alkyl acids (B) may preferably between 90/10 and 10/90, preferably between 80/20 and 20/80 and more preferably between 70/30 and 30/70.

Preferably, the poly(oxy-$C_{1-6}$-alkylenecarbonyl) compounds (A) are linear hydroxy-$C_{1-6}$-alkylenecarboxylic acids or lactones, preferably δ-valerolactone or ε-caprolactone.

Preferably, the poly(oxy-$C_{1-6}$-alkylenecarbonyl) compounds (A) are homopolymers having different chain lengths. Accordingly, the POAC side chains of the dispersant of the invention differ in terms of their chain length.

Preferably, the polymers are prepared separately or in situ by polymerization of the poly(oxy-$C_{1-6}$-alkylenecarbonyl) compounds (A) and then used for the reaction with polyamines or polyimines and alkyl acids (B).

It is possible to use any polymerization methods known to those skilled in the art, for instance anionic, cationic or metal-catalyzed polymerization. Likewise conceivable are bulk or solution polymerization. It is important here that a narrow molar mass distribution of the polymers is ensured, in order that polymers having a particular chain length can be achieved and used for the method of the invention, in order to form POAC chains of different chain length in the dispersant.

In a preferred embodiment, a ring-opening polymerization of the lactones is used for preparation of the polymers. The catalysts used here may be titanium tetraalkyl or tetraalkoxylates, for example tetraisopropyl orthotitanate (Ti(OiPr)$_4$), tetra-2-ethylhexanoate titanate (Ti(2-ethylhexanoate)$_4$) or tetra-2-ethylhexyl titanate (Ti(2-ethylhexyloxide)$_4$), zinc salts of organic acids, for example zinc acetate (Zn(acetate)$_2$) or zinc lactate (Zn(lactate)$_2$), zirconium salts of aliphatic alcohols, for example zirconium tetraisopropyloxide (Zr(OiPr)$_4$) or zirconium n-butoxide (Zr(OnBu)$_4$), arylsulphonic acids, for example toluenesulphonic acid, or strong organic acids, for example toluenesulphonic acid, or strong organic acids such as haloacetic acids, bismuth alkylates, for example bismuth neodecanoate (Bi(neodecanoate)$_3$), tin alkylates, for example tin octanoate (Sn(Oct)$_2$). Zirconium tetraisopropyloxide (Zr(OiPr)$_4$) and zirconium butoxide (Zr(OnBu)$_4$) are used with preference.

Preferably, for polymerization, alkyl acids are used as polymerization initiator, for example aromatic, alicyclic, heterocyclic or aliphatic carboxylic acids, which are linear or branched, and saturated or unsaturated.

Preferably, the alkyl acids have 1 to 35 carbon atoms, preferably not more than 20 carbon atoms and more preferably not more than 12 carbon atoms.

Preferably, the alkyl acids are selected from the group of acetic, methoxyacetic, propionic, pentanoic, hexanoic, caprylic, capric, lauric, ricinoleic, stearic acid and hydroxystearic acid.

For the method of the invention, accordingly, preferably the polymers prepared above are reacted with the polyamines or polyimines and alkyl acids (B).

Preferably, for the reaction, that alkyl acid (B) which has likewise been used as polymerization initiator is used. It has been found that, advantageously, amidation on the polyamine or polyimine for formation of further side chains counters crystallization of the dispersant.

It is likewise conceivable that the reduction of the crystallization tendency of the dispersant of the invention can be achieved by setting a reduced pressure during the reaction of polyamines or polyimines with at least two or more polymers based on poly(oxy-$C_{1-6}$-alkylenecarbonyl) compounds (A) and alkyl acids (B). Preferably, a reduced pressure is less than standard pressure (1013.25 mbar), and is more preferably 1-500 mbar.

In addition, for the method of the invention, it is preferably possible to use the poly(oxy-$C_{1-6}$-alkylenecarbonyl) compounds (A), polyamines or polyimines and alkyl acids (B) listed at the start of the description.

It has been found that the dispersants of the invention do not have any changes when stored at room temperature even for up to 2 months.

The dispersants of the invention are especially suitable for dispersing a particulate solid in an organic medium. In a further aspect of the invention, a composition comprising a particulate solid and a dispersant according to the present invention is provided.

The present invention likewise provides a dispersion comprising dispersants according to the present invention, a particulate solid and an organic medium.

The solid present in the dispersion may be any inorganic or organic solid material which is essentially insoluble in the organic medium at the temperature in question and which is to be stabilized in a finely divided form therein.

Examples of suitable solids are pigments for solvent-based inks, pigments, extenders and fillers for inks and polymer materials; dyes, especially disperse dyes; optical brighteners and textile additives for solvent dying baths, inks and other solvent-based application systems; solids for oil-based and invert emulsion drilling muds; soil and solid particles in dry-cleaning fluids; particulate ceramic materials; magnetic materials and magnetic recording media and biocides, agrochemicals and pharmaceuticals which are used as dispersion is an organic media.

A preferred solid is a pigment from any of the recognized classes of pigments which are described, for example, in Third Edition of the Color Index (1971) and subsequent revisions and supplements in the chapter entitled "Pigments". Examples of inorganic pigments are titanium dioxide, zinc oxide, Prussian blue, cadmium sulphide, iron oxide, vermilion, ultramarine and the chromium pigments, including chromates, molybdates and mixed chromates and sulphates of lead, zinc, barium, calcium and mixtures and modifications thereof, which are commercially available as greenish-yellow to red pigments under the primrose chrome, lemon/middle chrome, orange chrome, scarlet chrome and red chrome names. Examples of organic pigments are those from the group of the azo, diazo, condensed azo, thioindigo, indanthrone, isoindanthrone, anthanthrone, anthraquinone, isodibenzanthrone, triphendioxazine, quinacridone and phthalocyanine pigments, especially copper phthalocyanine and the ring-halogenated derivatives thereof, and also varnishes composed of acidic, basic and mordant dyes. Even though it is strictly inorganic, carbon black behaves more like an organic pigment with regard to its dispersion properties. Examples of organic pigments are phthalocyanine pigments, especially copper phthalocyanine, and monoazo, disazo, indanthrone, anthanthrone, quinacridone and carbon black pigments.

Further preferred solids are extenders and fillers, such as talc, kaolin, silicon dioxide, baryte and chalk; particulate ceramic materials, such as aluminum oxide, silicon dioxide, zirconium dioxide, titanium dioxide, silicon nitride, boron nitride, silicon carbide, boron carbide, mixed silicon aluminum nitrides and metal titanates, particulate magnetic materials, such as the magnetic oxides of transition metals, especially iron and chromium, e.g. gamma-$Fe_2O_3$, $Fe_3O_4$ and cobalt-doped iron oxides, calcium oxide, ferrites, especially barium ferrites, and metal particles, especially metallic iron, nickel, cobalt and alloys thereof, and agrochemicals, for example the fungicides flutriafen, carbendazim, chlorthalonil and mancozeb.

The organic medium present in the dispersions of the invention is preferably a polar organic medium or an essentially nonpolar aromatic hydrocarbon or halogenated hydrocarbon. The term "polar" in relation to the organic medium means an organic liquid or resin capable of forming moderate to strong bonds, as described in the article entitled "A Three Dimensional Approach to Solubility" by Crowley et al. in Journal of Paint Technology, volume 38, 1966, on page 269. Such organic media generally have a hydrogen bonding number of 5 or more, as described in the above-cited article.

Examples of suitable polar organic media are amines, ethers, especially lower alkyl ethers, organic acids, esters, ketones, glycols, alcohols and amides. Numerous specific examples of such moderately strong hydrogen bonding-liquids are specified in the book entitled "Compatibility and Solubility" by Ibert Mellan (published in 1968 by Noyes Development Corporation) in Table 2.14 on pages 39-40. The liquids mentioned in the publication are all covered by the scope of the term "polar organic medium", and are thus part of the present disclosure.

Preferred polar organic liquids are dialkyl ketones, alkyl esters of alkanecarboxylic acids and alkanols, especially those liquids which contain up to and including a total number of 6 carbon atoms. Particularly preferred organic media are dialkyl and cycloalkyl ketones, such as acetone, methyl ethyl ketone, diethyl ketone, diisopropyl ketone, methyl isobutyl ketone, diisobutyl ketone, methyl isoamyl ketone, methyl n-amyl ketone and cyclohexanone; alkyl esters, such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate, alkanols, such as methanol, ethanol, n-propanol, isopropanol, n-butyl and isobutanol, and dialkyl ethers and cyclic ethers, such as diethyl ether and tetrahydrofuran.

The essentially nonpolar media which can be used either alone or in a mixture with the aforementioned polar solvents are aromatic hydrocarbons, such as toluene and xylene, and halogenated aliphatic and aromatic hydrocarbons, such as trichloroethylene, perchloroethylene and chlorobenzene.

Examples of suitable polar resins as medium for the dispersion form of the present invention are those film-forming resins that are suitable for the production of inks, dyes and turnings for use in numerous applications such as dyes and inks. Examples of such resins include polyamides, such as Versamid® from the BASF SE Company, for example, or cellulose ethers, such as ethylcellulose and ethylhydroxyethylcellulose. Examples of paint resins include short-oil alkyd/melamine-formaldehyde resins, polyester/melamine-formaldehyde resins, thermosetting acrylic/melamine-formaldehyde resins, long-oil alkyd resins, and multi-layer resins such as acrylic and urea/aldehyde resins.

The dispersion may if desired comprise other constituents, examples being resins (if they do not already constitute the organic medium), binders, liquefying agents (such as those described in GB-A-1508576 and GB-A-2108143), sedimentation-preventing agents, plasticizing agents, leveling agents and preservatives.

The compositions of the present invention, especially the preferred dispersions, contain usually from 5 to 95 wt % of the finely divided solid, with the precise amount depending on the nature of the solid and on the relative density of the solid and of the organic medium. For example, a dispersion in which the solid is an organic substance, such as an organic pigment, contains preferably from 15 to 60 wt % of the solid, whereas a dispersion in which the solid is an inorganic substance, such as an inorganic pigment, filler agent or extender, contains preferably from 40 to 90 wt % of the finely divided solid, based on the total weight of the dispersion.

The composition of the invention, more particularly the dispersion of the invention, may be obtained by any of the customary methods for producing compositions and dispersions. The solid, the organic medium and the dispersing resin of the invention may generally be mixed in any desired order. The mixture in this case may be subjected to a mechanical method for reducing the size of the particles of the solid to a suitable size, for example by ball-milling, bead-milling, gravel-milling or plastics rolling. The solid, independently or in admixture with either the organic medium or the dispersing resin, may alternatively be treated in order to reduce its particle size, after which the other constituent or constituents of the composition may be added, and the mixture may be stirred in order to produce the composition, preferably the dispersion.

If the composition is needed in dry form, the liquid medium is preferably volatile, and so may easily be removed from the particulate solid by simple separating means, such as evaporation. It is nevertheless preferred for the dispersion to comprise the liquid medium.

If the dry composition consists essentially of the dispersing resin and the particulate solid, it preferably contains at least 0.2 wt %, more preferably at least 0.5 wt % and preferably at least 1.0 wt % of the dispersing resin of the invention, based on the weight of particulate solid. The dry composition preferably contains not more than 50 wt %, more preferably not more than 20 wt % and preferably not more than 10 wt % of the dispersing resin of the invention, based on the weight of the particulate solid.

As described above, the dispersing resins of the present invention are particularly suitable for producing millbase. In a further embodiment of the present invention, the particulate solid may be ground in the presence of a dispersing resin of the invention and a film-forming resin binder, optionally in the presence of an organic medium.

In accordance with a further aspect of the invention, therefore, a millbase is provided which comprises a particulate solid, dispersing resin according to the present invention, and a film-forming resin.

The millbase customarily comprises from 20 to 70 wt % of particulate solid in relation to the total weight of the millbase. The particulate solid amounts preferably to not less than 30 wt % and more preferably not less than 50 wt % of the millbase.

The amount of the resin in the millbase may fluctuate within a wide range, but is preferably not less than 10 wt % and more preferably not less than 20 wt % in relation to the total weight of the millbase.

The amount of the dispersing resin of the invention in the millbase is dependent on the amount of the particulate solid, but is preferably from 0.5 to 5 wt %, based on the millbase.

Dispersions and millbases which comprise the dispersing resins according to the present invention are suitable in particular for use in paints, preferably paints with high solids content, and in liquid inks, preferably liquid inks for flexographic printing, gravure inks and screen printing inks. Furthermore, they are of advantageous suitability for use in non-aqueous ceramic techniques, particularly in belt coating, in spreading methods using a doctor blade, or in extrusion or injection molding methods.

Accordingly, the present invention further provides an ink or printing ink comprising a particulate solid, a film-forming resin, an organic medium and a dispersant according to the present invention.

Examples of suitable polar resins as medium for the dispersion form of the present invention are those film-forming resins that are suitable for the production of inks, dyes and turnings for use in numerous applications such as dyes and inks. Examples of such resins include polyamides, such as Versamid* from the BASF SE Company, for example, or cellulose ethers, such as ethylcellulose and ethylhydroxyethylcellulose. Examples of paint resins include short-oil alkyd/melamine-formaldehyde resins, polyester/melamine-formaldehyde resins, thermosetting acrylic/melamine-formaldehyde resins, long-oil alkyd resins, and multi-layer resins such as acrylic and urea/aldehyde resins.

Even without further elaboration it is believed that a person skilled in the art will be able to make the widest use of the above description. The preferred embodiments and examples are therefore to be understood merely as a descriptive disclosure which is not in any way intended to be limiting.

The present invention will now be more particularly described with reference to examples. Alternative embodiments of the present invention are obtainable analogously.

1. Preparation of Polymers

For the preparation of the dispersant of the invention, the polymers are first prepared either separately (Examples 1 and 2) or in situ (Example 3) by ring-opening polymerization. The numbers 1:9 and 1:6 in brackets are the molar ratios of the components and hence represent the chain length of the polymers.

Polymer 1: Lauric Acid and ε-caprolactone (1:9)

A four-neck flask provided with a stirrer, thermometer, reflux condenser and nitrogen inlet tube is initially charged with lauric acid (1 mol) and ε-caprolactone (9 mol), and heated up to 100° C. while stirring under $N_2$ gas. Subsequently, zirconium butoxide (0.5%) is added and the mixture is heated further to 160° C. under $N_2$ gas. The mixture is stirred at this temperature for about 4 hours.

A solid that was yellow in color was obtained. The reaction had a conversion of more than 95%.

Polymer 2: Lauric Acid and ε-caprolactone (1:6)

A four-neck flask provided with a stirrer, thermometer, reflux condenser and nitrogen inlet tube is initially charged with lauric acid (1 mol) and ε-caprolactone (6 mol), and heated up to 100° C. while stirring under $N_2$ gas. Subsequently, zirconium butoxide (0.5%) is added and the mixture is heated further to 160° C. under $N_2$ gas. The mixture is stirred at this temperature for about 4 hours.

A solid that was yellow in color was obtained. The reaction had a conversion of more than 95%.

Polymer 3: Lauric Acid and ε-caprolactone, In Situ (1:9) and (1:6)

A four-neck flask provided with a stirrer, thermometer, reflux condenser and nitrogen inlet tube is initially charged with lauric acid (1 mol) and ε-caprolactone (3 mol), and heated up to 100° C. while stirring under $N_2$ gas. Subsequently, the zirconium butoxide is added and the mixture is heated further to 160° C. under $N_2$ gas. The mixture is stirred at this temperature (about 4 hours) until the conversion of ≥90% is attained. The temperature is reduced to 105° C., and lauric acid (1 mol) and ε-caprolactone (6 mol) are again initially charged under $N_2$ gas and the mixture is stirred for 3 hours. Subsequently, zirconium butoxide (0.5%) is added again and the mixture is heated further to 160° C. under N2 gas. The mixture is stirred at this temperature for about 4 hours.

A solid that was yellow in color was obtained. The reaction had a conversion of more than 95%.

2. Synthesis of Dispersants

Dispersant 1 (D1)

Polymer 1 (0.25 mol) and polymer 2 (0.25 mol) were heated to 65° C. Polyethyleneimine (1.5 mol based on primary amines, Lupasol PR 8515, MW 2000, from the BASF SE Company) and lauric acid (0.5 mol) were added. The mixture was stirred at 160° C. and 15 mbar for 4 hours. On cooling, the product was obtained in the form of an amber viscous liquid.

Dispersant 2 (D2)

Polymer 1 (0.30 mol) and polymer 2 (0.30 mol) were heated to 65° C. Polyethyleneimine (1.5 mol based on primary amines, Lupasol PR 8515, MW 2000, from the BASF SE Company) and lauric acid (0.4 mol) were added. The mixture was stirred at 160° C. and 15 mbar for 4 hours. On cooling, the product was obtained in the form of an amber viscous liquid.

Dispersant 3 (D3)

Polymer 1 (0.30 mol) and polymer 2 (0.30 mol) were heated to 65° C. Polyethyleneimine (1.5 mol based on primary amines, Lupasol PR 8515, MW 2000, from the BASF SE Company) and lauric acid (0.3 mol) were added. The mixture was stirred at 160° C. and 15 mbar for 4 hours. On cooling, the product was obtained in the form of an amber viscous liquid.

Dispersant 4 (D4)

Polymer 1 (0.275 mol) and polymer 2 (0.275 mol) were heated to 65° C.; polyethyleneimine (1.5 mol based on primary amines, Lupasol PR 8515, MW 2000, from the BASF SE Company) and lauric acid (0.45 mol) were added. The mixture was stirred at 160° C. and 15 mbar for 4 hours. On cooling, the product was obtained in the form of an amber viscous liquid.

Dispersant 5 (D5)

Polymer 1 (0.25 mol) and polymer 2 (0.25 mol) were heated to 65° C.; polyethyleneimine (1.5 mol based on primary amines, Lupasol PR 8515, MW 2000, from the BASF SE Company) and lauric acid (0.4 mol) were added. The mixture was stirred at 160° C. and 15 mbar for 4 hours. On cooling, the product was obtained in the form of an amber viscous liquid.

Dispersant 6 (D6)

Polymer 1 (0.225 mol) and polymer 2 (0.225 mol) were heated to 65° C.; polyethyleneimine (1.5 mol based on primary amines, Lupasol PR 8515, MW 2000, from the BASF SE Company) and lauric acid (0.45 mol) were added. The mixture was stirred at 160° C. and 15 mbar for 4 hours. On cooling, the product was obtained in the form of an amber viscous liquid.

Dispersant 7 (D7)

Polymer 1 (0.225 mol) and polymer 2 (0.225 mol) were heated to 65° C.; polyethyleneimine (1.5 mol based on primary amines, Lupasol PR 8515, MW 2000, from the BASF SE Company) and lauric acid (0.55 mol) were added. The mixture was stirred at 160° C. and 15 mbar for 4 hours. On cooling, the product was obtained in the form of an amber viscous liquid.

Dispersant 8 (D8)

Polymer 3 (0.5 mol) was heated to 65° C.; polyethyleneimine (1.50 mol based on primary amines, Lupasol PR 8515, MW 2000, from the BASF SE Company) and lauric acid (0.4 mol) were added. The mixture was stirred at 160° C. and 15 mbar for 4 hours. On cooling, the product was obtained in the form of an amber viscous liquid.

Dispersant 9 (D9)

Polymer 3 (0.6 mol) was heated to 65° C.; polyethyleneimine (1.50 mol based on primary amines, Lupasol PR 8515, MW 2000, from the BASF SE Company) and lauric acid (0.4 mol) were added. The mixture was stirred at 160° C. and 15 mbar for 4 hours. On cooling, the product was obtained in the form of an amber viscous liquid.

Dispersant 10 (D10)

Polymer 3 (0.55 mol) was heated to 65° C.; polyethyleneimine (1.50 mol based on primary amines, Lupasol PR 8515, MW 2000, from the BASF SE Company) and lauric acid (0.35 mol) were added. The mixture was stirred at 160° C. and 15 mbar for 4 hours. On cooling, the product was obtained in the form of an amber viscous liquid.

In the course of storage at room temperature for up to two months, no changes in the amber viscous liquid were detected in any of the dispersants of the invention.

3. Production of Comparative Dispersants

Comparative Dispersant 1 (CD1)

Polymer 1 from Example 1 (1.10 mol) was heated to 65° C.; polyethyleneimine (1.50 mol based on primary amines, Lupasol PR 8515, MW 2000, from the BASF SE Company) and lauric acid (0.50 mol) were added. The mixture was stirred at 160° C. and 15 mbar for 4 hours. On cooling, the product was obtained in the form of a yellow solid.

Comparative Dispersant 2 (CD2)

Polymer 1 (0.45 mol) was heated to 65° C.; polyethyleneimine (1.50 mol based on primary amines, Lupasol PR 8515, MW 2000, from the BASF SE Company) and lauric acid (0.55 mol) were added. The mixture was stirred at 160° C. and 15 mbar for 4 hours. On cooling, the product was obtained in the form of an amber viscous liquid, but solidifies over time.

Comparative Dispersant 3 (CD3)

Polymer 1 (0.50 mol) was heated to 65° C.; polyethyleneimine (1.50 mol based on primary amines, Lupasol PR 8515, MW 2000, from the BASF SE Company) and lauric acid (0.7 mol) were added. The mixture was stirred at 160° C. and 15 mbar for 4 hours. On cooling, the product crystallizes out.

Comparative Dispersant 4 (CD4)

Polymer 1 (0.60 mol) was heated to 65° C.; polyethyleneimine (1.50 mol based on primary amines, Lupasol PR 8515, MW 2000, from the BASF SE Company) and lauric acid (0.4 mol) were added. The mixture was stirred at 160° C. and 15 mbar for 4 hours. On cooling, the product crystallizes out.

4. Determination of Acid Number and Amine Number 4.1 Acid Number

The degree of conversion is determined via a volumetric determination of the acid number (AcN). The acid number indicates the mg of KOH required to neutralize the free acids present in 1 g of product. The method was established on the basis of DGF C-V 2, Ph.EUR. 2.5.1, ISO 3682, ASTM D 974, DIN EN ISO 2114.

To determine the acid number, the sample is dissolved in a suitable solvent and then the free acids present are titrated with potassium hydroxide solution. The solvent used is a mixture of ethanol and toluene in a ratio of 1:1. Other possible solvents are, for example, ethanol or isopropanol, the alternative solvents having no effect on the result of the test method. The solvents or solvent mixtures used should merely be neutralized in advance using phenolphthalein, in order to avoid distortion of the analysis result. Useful titrants include 0.5 N potassium hydroxide solution, 0.1 N potassium hydroxide solution and 0.02 N potassium hydroxide solution. A useful solvent for the potassium hydroxide solution is water or ethanol. The indicator employed for the attainment of the changeover point may, for example, be a 1% phenolphthalein solution in ethanol. For the actual procedure, the sample to be analyzed is weighed accurately to 0.1 wt %. Subsequently, about 50-100 ml of the neutralized solvent are added and the sample, if necessary, is dissolved with gentle heating. After addition of the phenolphthalein solution, titration is performed with standard potassium hydroxide solution until there is a permanent color change. For evaluation, the following calculation formula is used:

$$\text{Acid number [mg KOH/g]} = \frac{V \times MKOH \times N}{E}$$

V=consumption of the titrant [ml]
N=normality of titrant
E=sample weight [g]
M KOH=molar mass of KOH 4.2 Amine Number The amine number can be determined by means of a method based AOCS Tf 1b-64, Afnor T-73-204, DIN EN ISO 4315. To determine the amine number, the sample is dissolved in a suitable solvent and then the free amines present are titrated with a standardized acid using an indicator. The amine number (AmN) indicates the mg of KOH corresponding to the basicity of 1 g of sample. A corresponding amount of sample is weighed accurately to 0.1 wt % directly into an Erlenmeyer flask or beaker and dissolved with about 100 ml of ethanol or isopropanol, optionally while heating. After adding a few drops of bromophenol blue solution, titration is done with the hydrochloric acid solution until the color changes from blue to yellow.

$$AmN \text{ [mg KOH/g]} = \frac{\text{ml consumed} * m * 56.109 * f}{E}$$

AmN=amine number
E=weight in g
56.109=molar mass of KOH
m=molarity of the hydrochloric acid solution
f=factor of the hydrochloric acid solution

TABLE 1

Acid number and amine number

|  | AcN (mgKOH/g) | AmN (mgKOH/g) |
| --- | --- | --- |
| Polymer 1 | 63.4 | — |
| Polymer 2 | 45.7 | — |
| Polymer 3 | 54.5 | — |
| D1 | 1.5 | 147 |
| D2 | 1.6 | 135 |
| D3 | 1.6 | 136 |
| D4 | 1.6 | 138 |
| D5 | 1.6 | 151 |
| D6 | 1.6 | 157 |
| D7 | 1.6 | 151 |
| D8 | 1.6 | 145 |
| D9 | 1.6 | 130 |
| D10 | 1.6 | 141 |
| CD 1 | 1.8 | 131 |
| CD 2 | 1.9 | 141 |
| CD 3 | 2.1 | 121 |
| CD 4 | 1.7 | 129 |

5. Performance Evaluation

For the production of the pigment concentrates and color pastes, the following general method parameters were fixed and established:

| | |
|---|---|
| Milling machine: | Speed Mixer DAC 150 FVZ (Hauschild Company) |
| Milling vessels: | FLACKTEK vessels max. 100 |
| Balls: | Zirconium silicate balls (diameter: 0.6-0.8 mm) |
| Amount of pigment concentrate: | |
| For organic pigments and carbon black: | 50.0 g |
| For inorganic pigments: | 30.0 g |
| Milling time: | Organic pigments and carbon black: 5 min |
| | Inorganic pigments: 3 min |
| Speed: | 2000 rpm for the pigment concentrate |
| | 3000 rpm for the color paste |

The following pigments were used:

Bayferrox 3920 from the Lanxess Company with Color Index PY42

Heliogen Blue L7085 from the BASF Company with Color Index PB15:3

Color black FW 200 from the Evonik Company with Color Index PBk 7

5.1 Pigment Concentrates

For the performance assessment, pigment concentrates according to the formulations from Table 2 were produced.

TABLE 2

| | Inorganic pigment concentrate | Organic pigment concentrate | Carbon black concentrate |
|---|---|---|---|
| Butyl acetate (solvent) | 2.6 g | 7.7 g | 7.2 g |
| Dispersant or comparative dispersant | 1.8 g | 2.5 g | 7.1 g |
| TEGO ® VariPlus LK (resin) | 20.6 g | 27.3 g | 26.2 g |
| Bayferrox 3920 | 25.0 g | | |
| Heliogen Blue L7085 | | 12.5 g | |
| Color Black FW 200 | | | 9.5 g |
| Sum total | 50.0 g | 50.0 g | 50.0 g |

All raw materials from Table 2, except for the particular pigment, are first weighed in a vessel, then homogenized with one another. Thereafter, the pigment is added and mixed with the raw materials.

For milling of the particular pigment, balls were added to the mixture and milling was done by stirring.

All the ground pigment concentrates were then cooled and filtered.

5.2 Color Paste

For the production of the color paste, an aromatics-free alkyd binder from Brillux with the product name Impredur 840 was used as a base varnish. Table 3 shows the mixing ratios between the base varnish and the pigment concentrate.

TABLE 3

| | Heliogen Blue L 7085 color paste | Bayferrox 3920 color paste | Color Black FW 200 color paste |
|---|---|---|---|
| Base varnish | 20 g | 20 g | 20 g |
| Organic pigment concentrate | 0.64 g | | |
| Inorganic pigment concentrate | | 0.80 g | |
| Carbon black concentrate | | | 0.84 g |

First of all, the base varnish is weighed out in a Flacktek vessel. The Speed Mixer was used to mix the base varnish and the pigment concentrate at 3000 rpm for 1 min. The color pastes produced were used for further application tests.

5.3 Application Tests

5.3.1 Rub-out Test:

For the "rub-out test", the color pastes were applied to a plate with a Leneta 150 μm drawdown bar. After drying time of 5 minutes, the 'rub-out test' is done, which consists in rubbing the applied varnish. The color values are determined correspondingly before and after the rubbing and the ΔE (delta E) or color differences are calculated, which is used as a measure for the distance between two colors and correspondingly the "rub-out test" enables an evaluation with regard to the pigment stabilization performance of the additive. In the reporting of color differences, the value of 1 or less than 1 denotes a difference which is not perceived by the human eye.

5.3.2 Color Strength

The colorimetric values were determined with an X-Rite Model SP 62 spectrometer. The color strength F was determined using the following measurement:

$$F = \frac{(100 - Y)^2}{2Y}$$

Y=the reflection capacity of the wavelength at absorption maximum

The color strength gives a statement with regard to the color intensity, which can vary according to the pigment, but also according to the dispersant and milling process. The higher the color strength, the better the dispersant.

5.3.3 Viscosity of the Pastes

For the rheological viscosity profiles, the RheoStress 1 from Thermo HAAKE was used. The dynamic viscosity curves were determined at a temperature of 25° C.±0.5 with the parallel plate measurement geometry. The lower the viscosity of the paste, the better the dispersant.

The results are compiled in Tables 4, 5 and 6.

TABLE 4

| Heliogen Blue L 7085 color paste | | | | |
|---|---|---|---|---|
| Pigment | Dispersants | F | ΔE | Paste viscosity (mPa*s) |
| Heliogen Blue L 7085 | D1 | 47.9 | 0.62 | 7533 |
| | D2 | 46.45 | 0.44 | 6382 |
| | D3 | 45.21 | 0.64 | 9362 |
| | D4 | 46.55 | 0.48 | 7068 |
| | D5 | 46.68 | 0.43 | 7014 |
| | D6 | 47.35 | 0.33 | 6887 |
| | D7 | 46.87 | 0.47 | 7920 |
| | D8 | 46.57 | 0.36 | 7576 |

TABLE 4-continued

Heliogen Blue L 7085 color paste

| Pigment | Dispersants | F | ΔE | Paste viscosity (mPa*s) |
|---|---|---|---|---|
| | D9 | 47.63 | 0.34 | 7301 |
| | D10 | 47.68 | 0.33 | 4313 |
| | CD 1 | 49.07 | 0.56 | 8247 |
| | CD 2 | 45.98 | 0.51 | 9111 |
| | CD 3 | 46.08 | 0.48 | 7424 |
| | CD 4 | 48.01 | 0.35 | 3423 |

TABLE 5

Bayferrox 3920 color paste

| Pigment | Dispersant | F | ΔE | Paste viscosity (mPa*s) |
|---|---|---|---|---|
| Bayferrox 3920 | D1 | 6.36 | 0.64 | 6996 |
| | D2 | 6.53 | 0.24 | 6981 |
| | D3 | 6.27 | 0.75 | 9229 |
| | D4 | 5.97 | 1.23 | 10140 |
| | D5 | 6.53 | 0.21 | 8747 |
| | D6 | 5.86 | 1.58 | 13000 |
| | D7 | 5.64 | 1.06 | 11380 |
| | D8 | 6.67 | 0.43 | 8156 |
| | D9 | 6.7 | 0.44 | 7121 |
| | D10 | 6.78 | 0.21 | 6945 |
| | CD 1 | 6.63 | 0.44 | 7295 |
| | CD 2 | 6.45 | 0.35 | 7777 |
| | CD 3 | 6.53 | 0.41 | 6110 |
| | CD 4 | 6.85 | 0.45 | 6975 |

TABLE 6

Color Black FW 200 color paste

| Pigment | Dispersant | F | ΔE | Paste viscosity (mPa*s) |
|---|---|---|---|---|
| Color Black FW 200 | D1 | 142.79 | 0.09 | 1079 |
| | D2 | 141.14 | 0.1 | 1219 |
| | D3 | 142.11 | 0.28 | 923 |
| | D4 | 141.98 | 0.28 | 942 |
| | D5 | 140.86 | 0.19 | 1000 |
| | D6 | 140.96 | 0.15 | 1164 |
| | D7 | 141.54 | 0.21 | 1034 |
| | D8 | 142.95 | 0.09 | 1002 |
| | D9 | 141.24 | 0.16 | 997 |
| | D10 | 142.57 | 0.08 | 984 |
| | CD 1 | 141.57 | 0.38 | 1002 |
| | CD 2 | 137.85 | 0.57 | 3073 |
| | CD 3 | 142.08 | 0.33 | 1171 |
| | CD 4 | 142.38 | 0.14 | 867 |

Based on conducted application tests, it was concluded that the dispersants of the invention do not differ significantly from those from the prior art (comparative dispersants). The color strength, the paste viscosity and delta E values of the dispersants of the invention barely differ from those from the prior art.

In summary, it can be stated that the dispersants of the invention can on the whole be used as solvent-free additives for production of various pigment concentrates. The dispersants of the invention are suitable both for organic and inorganic pigments. Use with carbon black-containing pigments is likewise possible. Furthermore, the polymers (A) prepared in situ in particular can dispense with further time-consuming and costly production steps.

The invention claimed is:

1. A dispersant based on polyamines or polyimines each having primary amino groups, wherein the polyamines or polyimines contain a first side chain based on two or more poly(oxy-$C_{1-6}$-alkylenecarbonyl) compounds (A) selected from the group consisting of glycolic acid, lactic acid, hydroxyvaleric acid, hydroxycaproic acid, β-propiolactone, γ-butyrolactone, δ-valerolactone, and ε-caprolactone and a second side chain wherein the second side chain is the reaction product of a primary amino group on the polyamine or polyimine with an alkyl acid (B) selected from the group consisting of acetic, methoxyacetic, propionic, pentanoic, hexanoic, caprylic, capric, lauric, ricinoleic, stearic acid and hydroxystearic acid wherein the molar ratio of the sum total of the poly(oxy-$C_{1-6}$-alkylenecarbonyl) compounds (A) and alkyl acids (B) to primary amino groups of the polyamines or polyimines is less than 1.

2. The dispersant according to claim 1, wherein the at least two or more polymers based on poly(oxy-$C_{1-6}$-alkylenecarbonyl) compounds are selected from the group consisting of δ-valerolactone and ε-caprolactone.

3. The dispersant according to claim 1, wherein the dispersant has a ratio of amine number to acid number of >20.

4. The dispersants according to claim 3, wherein the polyimine is a polyethyleneimine.

5. The dispersant according to claim 4, wherein the mean molecular weight (Mw) of the polyethyleneimine is between 200 and 600 000 g/mol.

6. The dispersant according to claim 5, wherein the dispersant has an acid number of <10 mg KOH/g.

7. The dispersant according to claim 1, wherein the dispersant has a ratio of amine number to acid number of >10.

8. A method for preparing dispersants according to claim 1, comprising the reaction of polyamines or polyimines each comprising primary amino groups, with at least two or more polymers based on poly(oxy-$C_{1-6}$-alkylenecarbonyl) compounds (A) selected from the group consisting of glycolic acid, lactic acid, hydroxyvaleric acid, hydroxycaproic acid, β-propiolactone, γ-butyrolactone, δ-valerolactone, and ε-caprolactone and alkyl acids (B) selected from the group consisting of acetic, methoxyacetic, propionic, pentanoic, hexanoic, caprylic, capric, lauric, ricinoleic, stearic acid and hydroxystearic acid, wherein an amidation of alkyl acids (B) with the polyamines or polyimines takes place, wherein the molar ratio of the sum total of poly(oxy-$C_{1-6}$-alkylenecarbonyl) compounds (A) and alkyl acids (B) to primary amino groups of the polyamines or polyimines is less than 1.

9. The method according to claim 8, wherein the molar ratio between the two or more different poly(oxy-$C_{1-6}$-alkylenecarbonyl) chains (A) and the alkyl acids (B) is between 90/10 and 10/90, and wherein the poly(oxy-$C_{1-6}$-alkylenecarbonyl) compounds (A) are homopolymers and wherein the homopolymers have different chain lengths.

10. The method according to claim 9, wherein the polymers are prepared separately or in situ by polymerization of the homopolymers and then used for the reaction with polyamines or polyimines and alkyl acids (B).

11. The method according to claim 8, wherein the least two or more polymers based on poly(oxy-$C_{1-6}$-alkylenecarbonyl) compounds are selected from the group consisting of δ-valerolactone and ε-caprolactone.

12. The method according to claim 8, wherein the alkyl acids (B) correspond to the polymerization initiator for preparation of the at least two or more polymers based on poly(oxy-$C_{1-6}$-alkylenecarbonyl) compounds and are selected from the group of acetic, methoxyacetic, propionic, pentanoic, hexanoic, lauric, ricinoleic and stearic acid.

13. The method according to claim 10, wherein the polyimine is a polyethyleneimine.

14. The method according to claim 13, wherein the mean molecular weight (Mw) of the polyethyleneimine is between 200 and 600 000 g/mol.

15. The composition comprising a particulate solid and a dispersant according to claim 1.

16. A method of making an article selected from the group consisting of dispersions, millbases, inks or printing ink, the method comprising the step of making the article with the composition according to claim 15.

* * * * *

UNITED STATES PATENT AND TRADEMARK OFFICE
CERTIFICATE OF CORRECTION

PATENT NO. : 10,399,051 B2
APPLICATION NO. : 15/447424
DATED : September 3, 2019
INVENTOR(S) : Philippe Favresse et al.

It is certified that error appears in the above-identified patent and that said Letters Patent is hereby corrected as shown below:

Column 16,
Line 60, Claim 11, "claim 8, wherein the least" should read -- claim 8, wherein the at least --.

Signed and Sealed this
First Day of October, 2019

Andrei Iancu
*Director of the United States Patent and Trademark Office*